Figure 1:
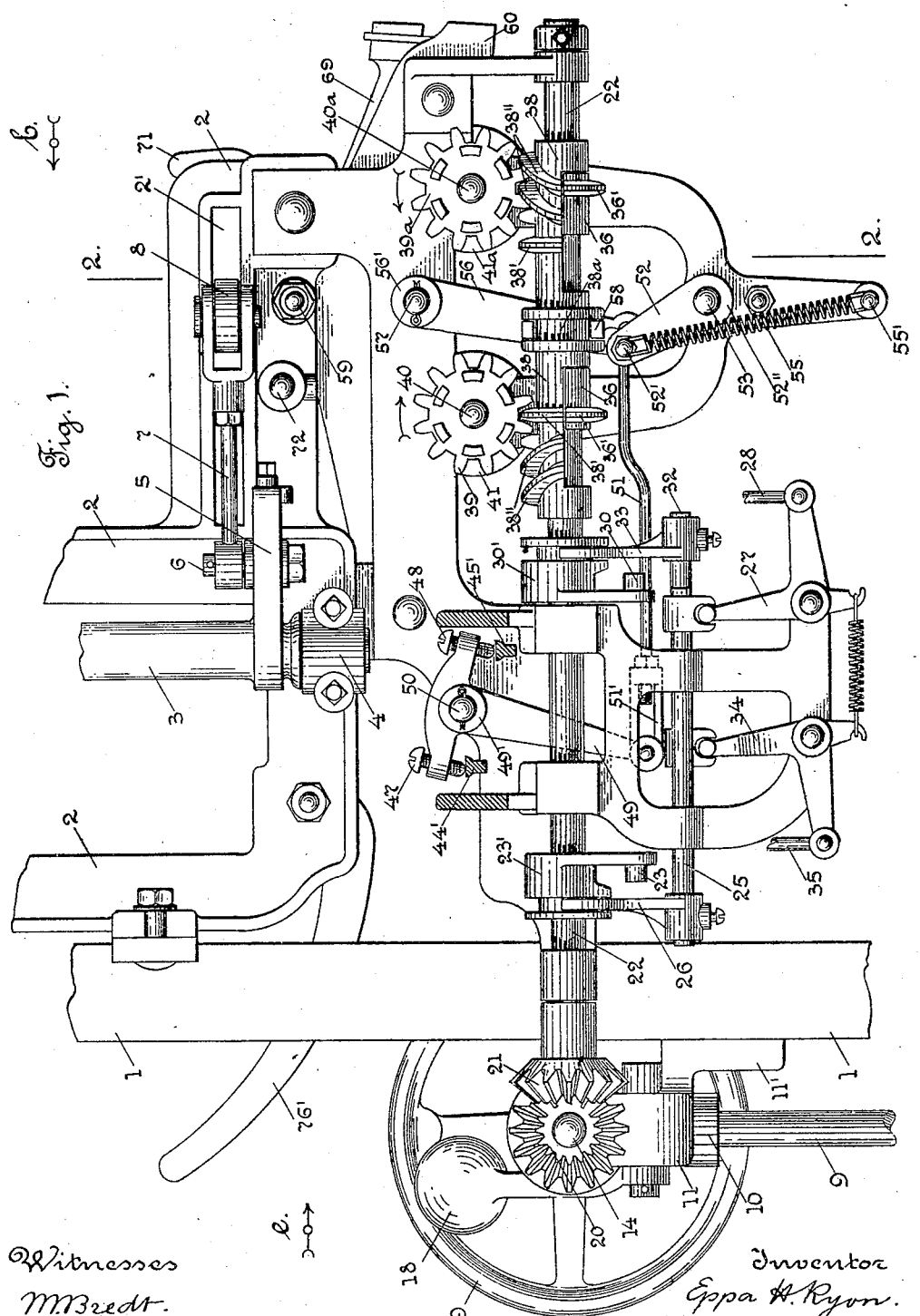

E. H. RYON.
DOBBY FOR LOOMS.
APPLICATION FILED JAN. 11, 1908.

936,479.

Patented Oct. 12, 1909.
6 SHEETS—SHEET 1.

Witnesses
M. Bredt.
M. Haas.

Inventor
Eppa H. Ryon.
By John E. Dewey
Attorney.

E. H. RYON.
DOBBY FOR LOOMS.
APPLICATION FILED JAN. 11, 1908.

936,479.

Patented Oct. 12, 1909.
6 SHEETS—SHEET 3.

Witnesses
M Bredt.
M. Haas.

Inventor
Eppa H Ryon
By John C. Dewey
Attorney.

E. H. RYON.
DOBBY FOR LOOMS.
APPLICATION FILED JAN. 11, 1908.
936,479.
Patented Oct. 12, 1909.
6 SHEETS—SHEET 4.
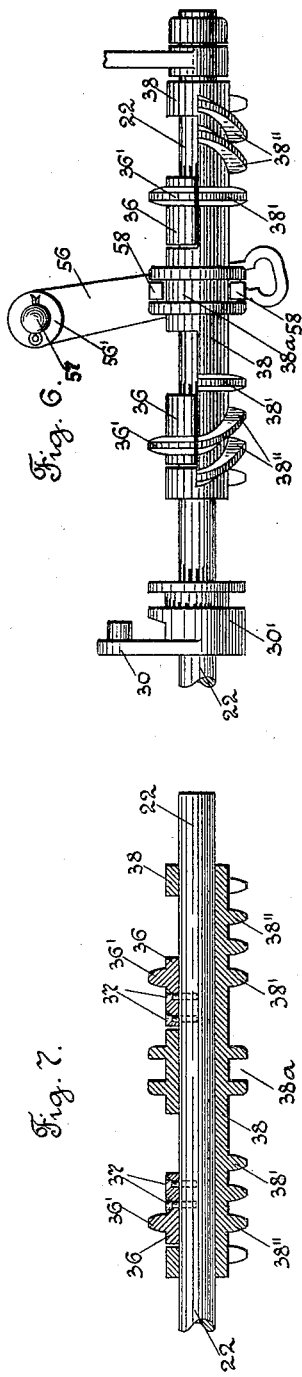
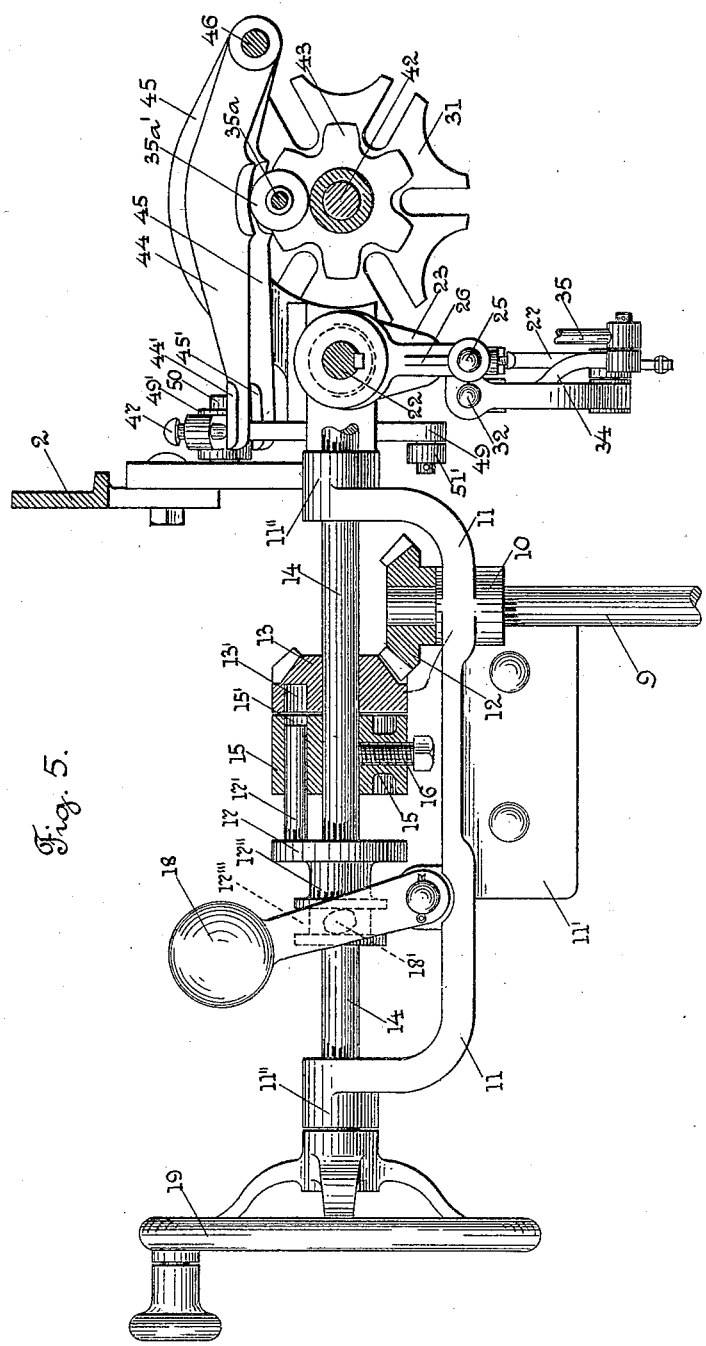
Witnesses
M. Bredt.
M. Haas.
Inventor
Eppa H. Ryon.
By John C. Dewey
Attorney.

E. H. RYON.
DOBBY FOR LOOMS.
APPLICATION FILED JAN. 11, 1908.

936,479.

Patented Oct. 12, 1909.

6 SHEETS—SHEET 5.

Witnesses
M. Bredt.
M. Haas.

Inventor
Eppa H. Ryon.
By John C. Dewey
Attorney.

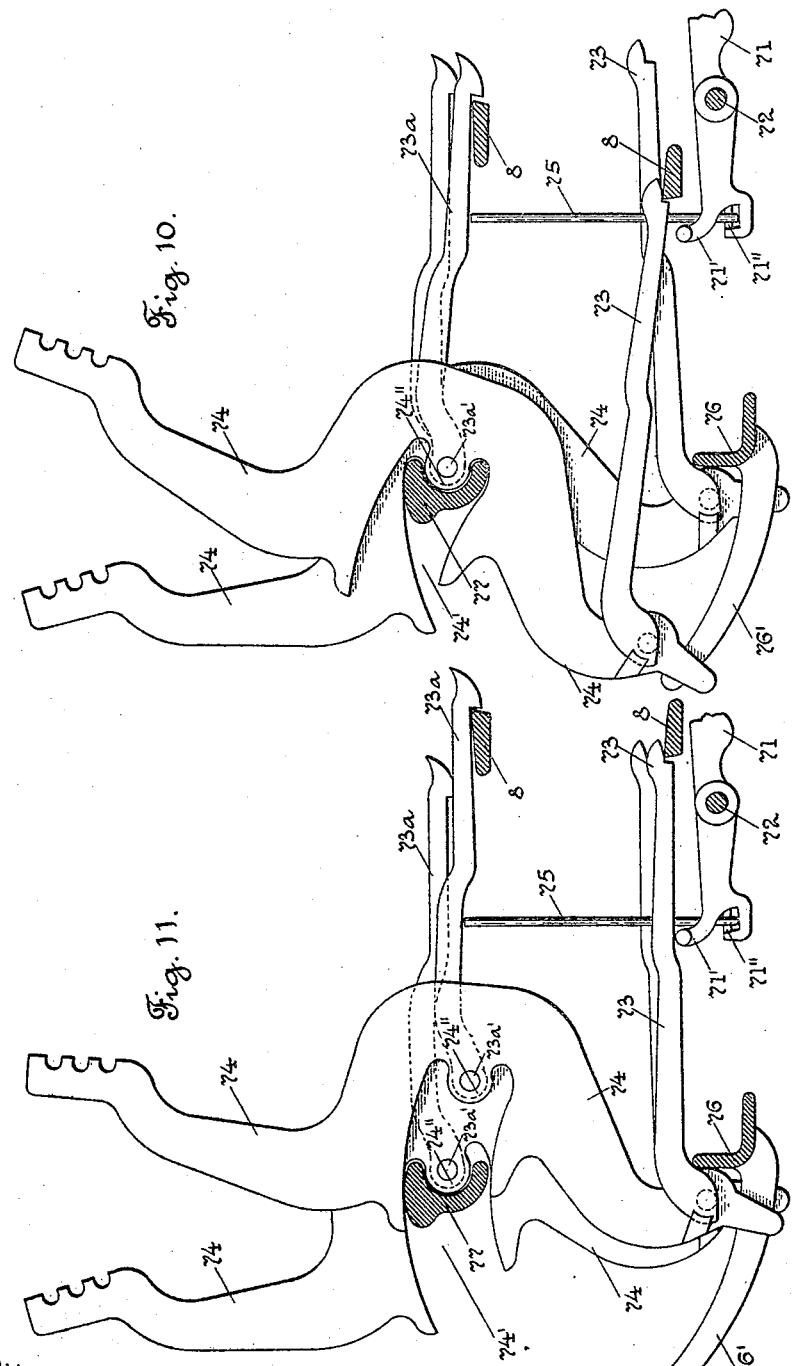

UNITED STATES PATENT OFFICE.

EPPA H. RYON, OF WORCESTER, MASSACHUSETTS, ASSIGNOR TO CROMPTON & KNOWLES LOOM WORKS, A CORPORATION OF MASSACHUSETTS.

DOBBY FOR LOOMS.

936,479. Specification of Letters Patent. Patented Oct. 12, 1909.

Application filed January 11, 1908. Serial No. 410,441.

*To all whom it may concern:*

Be it known that I, EPPA H. RYON, a citizen of the United States, residing at Worcester, in the county of Worcester and State of Massachusetts, have invented certain new and useful Improvements in Dobbies for Looms, of which the following is a specification.

My invention relates to a dobby for looms, and particularly to a dobby having two pattern cylinders which are adapted to be operated successively through a separate pattern surface, and a multiplier mechanism combined therewith.

I have shown in the drawings the type of dobby shown and described in my U. S. Letters Patent, No. 884,613, with my improvements combined therewith.

The object of my invention is to provide a dobby of improved construction, having two pattern cylinders, and my invention consists in certain novel features of construction of my improvements, as will be hereinafter fully described.

I have only shown in the drawings a detached portion of a dobby of the type referred to, with my improvements applied thereto, sufficient to enable those skilled in the art to understand the construction and operation thereof.

Figure 2:
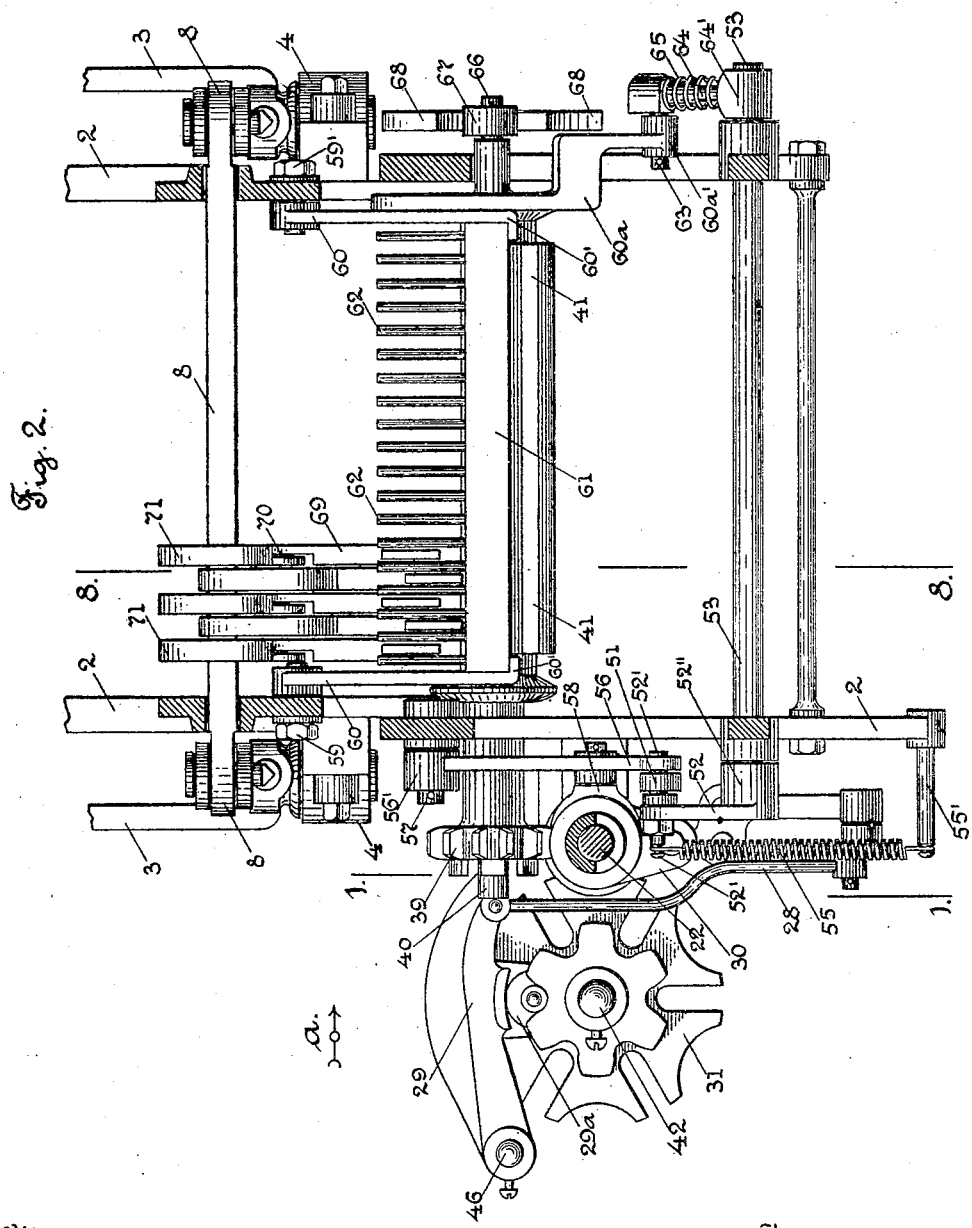
Figure 3:
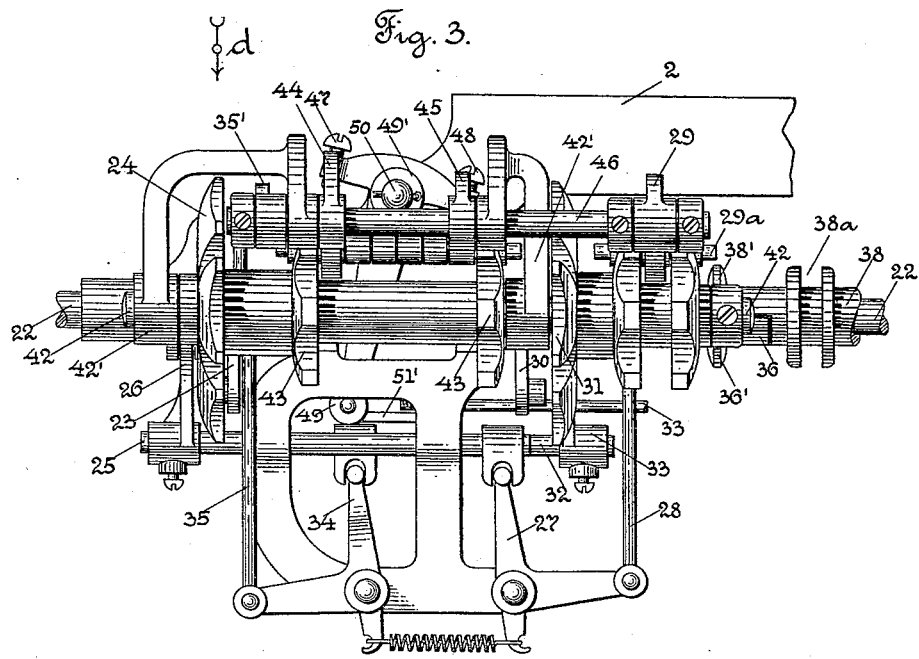
Figure 4:
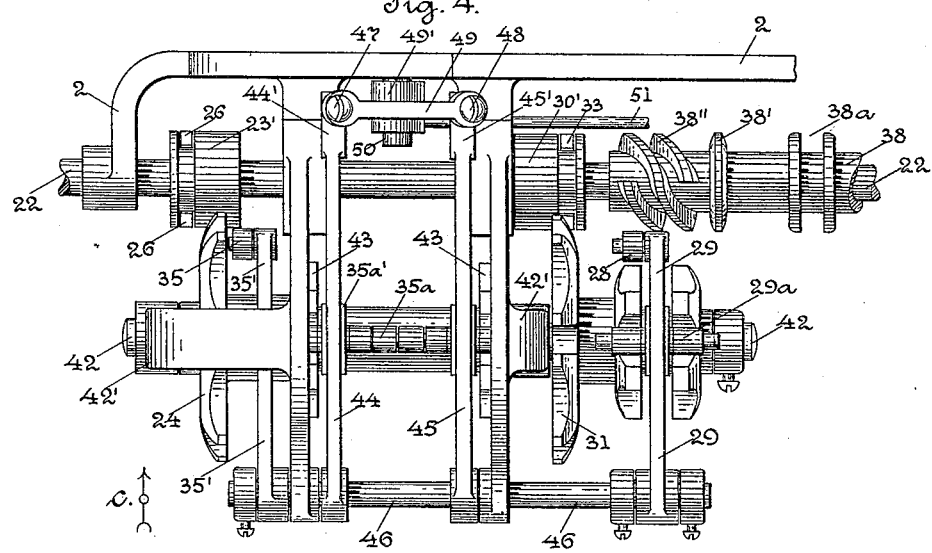
Figure 8:
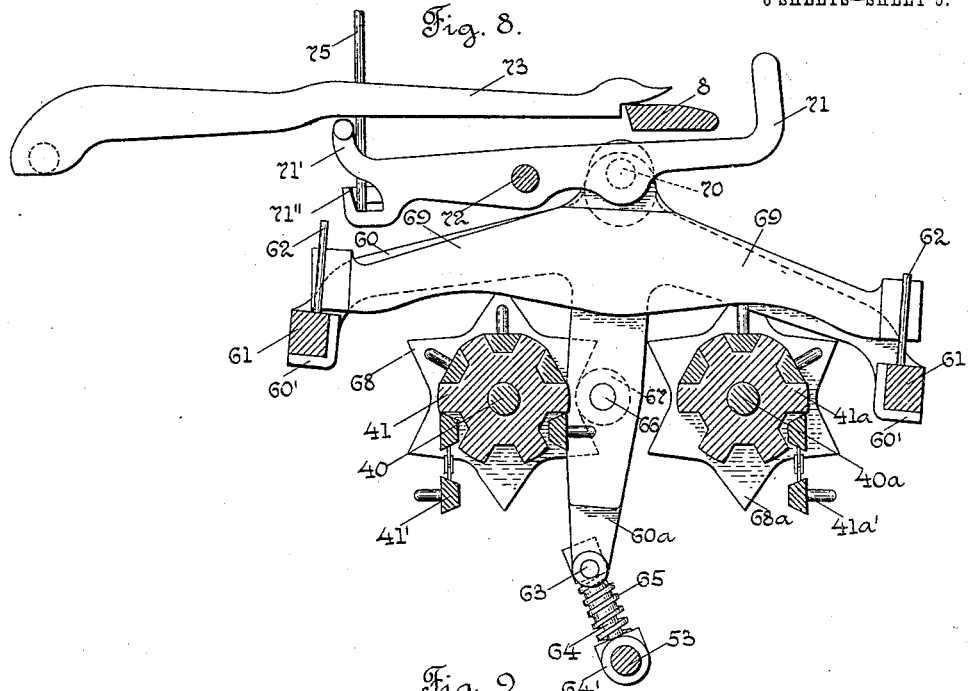
Figure 9:
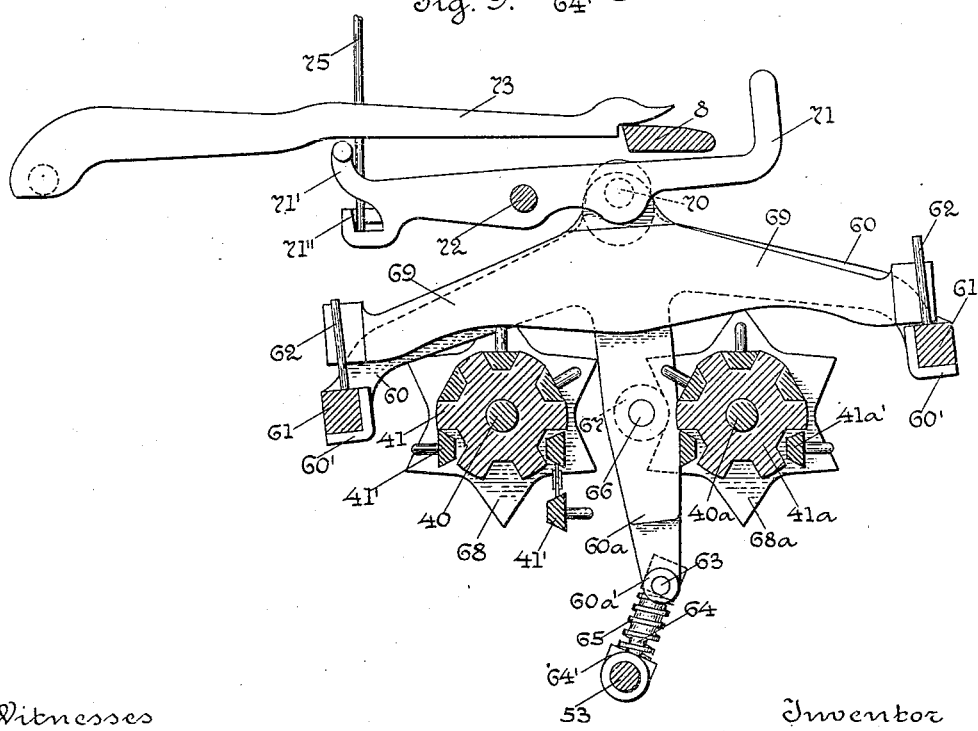

Referring to the drawings:—Figure 1 is a side elevation of a detached portion of a dobby of the type referred to, shown as a section on line 1, 1, Fig. 2, looking in the direction of arrow $a$, same figure. Fig. 2 is a section, on line 2, 2, Fig. 1, looking in the direction of arrow $b$, same figure; some of the parts shown in Fig. 1, are not shown in this figure. Fig. 3 is an end view of the box pattern chain and multiplier pattern chain mechanism, detached, with my improvements combined therewith, looking in the direction of arrow $c$, Fig. 4. Fig. 4 is a plan view of the parts shown in Fig. 3, looking in the direction of arrow $d$, same figure. Fig. 5 is a sectional end view of some of the parts shown in Fig. 1, looking in the direction of arrow $e$, same figure. Fig. 6 shows the sliding worm mechanism shown in Fig. 1, detached, and in a different position. Fig. 7 is a central longitudinal section of the sliding worm mechanism shown in Fig. 6. Fig. 8 is a section, on line 8, 8, Fig. 2, looking in the direction of arrow $a$, same figure, showing a diagrammatic view of some of the dobby fingers. Fig. 9 corresponds to Fig. 8, but shows some of the parts in their opposite position. Fig. 10 is a sectional view through the upper and lower lifter bar, and the fulcra of the harness jacks, showing two harness jacks with their hooks and their other parts detached, and, Fig. 11 corresponds to Fig. 10, but shows some of the parts in a different position.

As above stated, I have shown my improvements applied to the type of dobby shown and described in my U. S. Letters Patent, No. 884,613, to which Letters Patent reference is made for a detail construction of the type of dobby referred to.

In the accompanying drawings, 1 is a detached portion of a loom frame or side, 2 are parts of the dobby frame, on which the several parts of the dobby are supported.

3 is the lower part of a vertically extending rock bar, mounted at its lower end in a bearing 4 on the dobby frame.

5 is a crank arm attached to the rock bar 3.

6 is a stud adjustably secured to the crank arm 5, and connected by a rod or connector 7 with the lower lifter bar 8 which has a reciprocating movement in an elongated horizontal slot 2' in the dobby frame 2, in the usual way.

The upright shaft 9, which has a rotary movement communicated thereto from some driven part of the loom, not shown, has a bearing 10 at its upper end in a stand 11, having a foot or extension 11' bolted to the loom frame 1, see Figs. 1, and 5. On the upper end of the driven shaft 9 is fast a bevel gear 12, which meshes with a bevel gear 13, having a recess 13' therein, see Fig. 5, and loose on a horizontally extending shaft 14, mounted in bearings 11'' on the stand 11, see Fig. 5. The shaft 14 has fast thereon a collar 15, in this instance secured on said shaft by a screw 16. The collar 15 has a transverse opening 15' therethrough, to receive a pin 17' on a disk 17, which has its hub 17'' loose on the shaft 14, and is provided with an annular groove 17''' therein to receive a pin or stud 18', see Fig. 5, on a weighted handle 18. The collar 15, in connection with the disk 17 carrying the pin 17', acts as a clutch, by moving the handle 18 to carry the pin 17' into the recess 13' in the bevel gear 13, to clutch the bevel gear 13 to the shaft 14, and cause said shaft to have a rotary movement communicated thereto through the bevel gear 12 fast on the rotary shaft 9. By moving the handle 18 in the opposite direction, the pin 17′ is moved out of engagement with the opening 13′ in the bevel gear 13, see Fig. 5, to unclutch said bevel gear 13 from the shaft 14. By turning the hand wheel 19, fast on the outer end of the shaft 14, said shaft 14 may be rotated in either direction, to turn the dobby pattern chain cylinder in either direction.

On the inner end of the shaft 14 is fast a bevel gear 20, see Fig. 1, which meshes with and rotates a bevel gear 21 fast on the worm shaft 22, which is mounted in suitable bearings on the dobby frame. On the worm shaft 22 is splined the hub 23′ of a pin wheel 23, which is moved into and out of engagement with a star wheel 24, see Fig. 4, through the longitudinal movement of a rod 25, carrying a yoke-shaped arm 26, and operated through an angle lever 27, and connector 28, see Fig. 1, to a pattern indicator lever 29, extending over the multiplier pattern chain 29$^a$, in the usual way, see Fig. 4. The hub 30′ of a second pin wheel 30, is also splined on the worm shaft 22, and is moved into and out of engagement with a star wheel 31, see Fig. 4, through the longitudinal movement of a rod 32, carrying a yoke-shaped arm 33 and operated through an angle lever 34 and connector 35, see Fig. 1, to a pattern indicator lever 35′, extending over the box pattern chain 35$^a$, in the usual way, see Fig. 4.

The parts last above mentioned form the parts of a shuttle box and multiplier mechanism of well known construction and operation, and shown and described in Letters Patents of the United States, No. 413,369, and No. 617,290.

I will now describe the mechanism for operating the two dobby pattern chain cylinders, and the mechanism for operating the pattern indicator fingers or levers, according to the indications of the pattern chains on the dobby cylinders, to cause the movement of the dobby hooks, and of the harness levers, to form the sheds.

On the driven shaft 22 is mounted a worm driving mechanism of the type shown and described in my U. S. Letters Patent No. 879,496, which consists of two segments or portions 36, each secured upon the shaft 22, in this instance by two screws 37, see Figs. 6 and 7. Each segment 36 has a straight tooth or thread portion 36′ thereon, and each segment 35 fast on the driven shaft 22, co-operates with a sleeve 38 to communicate rotary movement to said sleeve 38, which is loosely mounted on the shaft 22. The sleeve 38 has thereon, in this instance two straight tooth or dwell portions 38′, one of which is adapted to be moved into alinement with one of the two straight tooth portions 36′, as shown at the left in Fig. 1, and the other of which is adapted to be moved into alinement with the other tooth portions 36′, as shown at the right in Fig. 6. When the two parts 38′ and 36′ are moved into alinement, as shown at the left in Fig. 1, then the worm gear 39, fast on the end of the shaft 40, of the pattern cylinder 41, will be held stationary; and when the other two straight portions 36′ and 38′ are moved into alinement, as shown at the right in Fig. 6, then the worm gear 39$^a$, see Fig. 1, fast on the shaft 40$^a$ of the pattern cylinder 41$^a$, will be held stationary. On the sleeve portion 38, there are also in this instance, near each end thereof, two worm thread portions 38″ for each worm gear 39, and 39$^a$, and when the sleeve portion 38 is moved to bring one set of worm thread portions 38″ in alinement with the straight tooth portion 36′ fast on the shaft 22, as shown at the right in Fig. 1, then the worm gear 39$^a$ will be rotated and also the pattern chain cylinder 41$^a$ connected therewith. There will be no revolutions of the pattern chain cylinder 41$^a$ for half a revolution of the shaft 22. When the worm thread portions 38″ at the other end of the sleeve 38 are brought into alinement with the other straight portions 36′, as shown at the left in Fig. 6, then the worm gear 39 will be rotated, and also the pattern chain cylinder 41 connected therewith. There will be a partial revolution, covering two teeth of the pattern chain cylinder 41, for each revolution of the shaft 22. Each of the worm gears 39, and 39$^a$, and the pattern chain cylinders 41, and 41$^a$, will be rotated in opposite directions, as indicated by arrows in Fig. 1, without reversing the direction of movement of shaft 22.

I will now describe the mechanism for moving the sleeve 38 longitudinally on the shaft 22, to cause the rotation of the worm gears 39, and 39$^a$, and the pattern cylinders 41, and 41$^a$, with which they are connected, respectively.

On the outside of the shaft 22 is mounted in suitable bearings 42′, a shaft 42, see Figs. 3 and 4, carrying the box pattern chain cylinder 43 loosely mounted thereon. The pattern chain cylinder 43 is rotated through the star wheel 24 engaged by the pin wheel 23, above described. The pattern chain cylinder 43 carries a pattern chain 35$^a$ only one roll 35$^{a'}$ of which is shown in Fig. 5. Extending over the pattern chain 35$^a$, on the cylinder 43 are two pattern indicator levers 44 and 45, which are pivotally mounted at their outer ends on a rod 46, suitably supported. The inner ends of the pattern indicator levers 44 and 45 are in this instance flattened on their upper surfaces, as shown at 44′ and 45′, in Figs. 1, and 4, and extend under and are adapted to engage in this instance the inner ends of two screws 47 and 48, see Fig. 1, which are adjustably mounted in oppositely extending projections on the upper end of a downwardly extending lever 49, having a hub 49' pivotally mounted on a stud 50 secured to the frame, see Fig. 1. The lower end of the lever 49 is connected, through a rod head 51', with one end of a connector 51. The other end of the connector 51 is pivotally mounted on a stud 52' on the upper end of an arm 52, having a hub 52'' pivotally mounted on the transverse rod 53, supported on the dobby frame, see Fig. 2. A helically coiled contraction spring 55 is attached at one end to the stud 52' on the arm 52, and at its other end to a pin 55' on a downward extension on the frame 2, see Figs. 1 and 2. The spring 55 acts to lock or hold the arm 52 and also the worm carrying sleeve 38, in their extreme opposite positions. The stud or pin 52' extends into an opening in the lower end of a lever 56, the hub 56' of which is pivotally mounted on a stud 57 on the dobby frame, see Figs. 1 and 2. The lever 56 has a yoke-shaped arm 58, see Figs. 1 and 2, pivotally attached thereto, which is adapted to extend into an annular recess 38$^a$ in a hub on the sleeve 38, see Fig. 1. Through the movement of the pattern indicator levers 44 and 45, according to the indications of the box pattern chain 35$^a$, and through the connections to the lever 56, the sleeve 38 of the worm mechanism is moved longitudinally on the shaft 22, to cause the rotary movement of one dobby pattern cylinder 41, or the rotary movement of the other dobby pattern cylinder 41$^a$. One pattern cylinder is held stationary while the other is rotated.

I will now describe the mechanism operated by the two dobby pattern chains 41', and 41$^{a\prime}$, on the pattern chain cylinders 41, and 41$^a$, respectively, see Figs. 8 and 9.

On bolts 59 and 59', see Fig. 2, is pivotally mounted a swinging frame 60, which extends over the two dobby cylinders 41, and 41$^a$, and consists of two oppositely extending arms 60' which are connected at their ends by the transverse bars 61, see Figs. 2, 8, and 9; each transverse bar 61 has a series of upwardly extending guide pins 62 thereon between which the pattern indicator levers, to be hereinafter described, extend. The swinging frame 60 has a downwardly extending arm 60$^a$ at one end, see Fig. 2, which has a boss 60$^{a\prime}$ thereon, into which loosely extends a pin 63 on the upper end of a stud 64. The lower end 64' of which is pivotally mounted on the end of the transverse rod 53. A helically coiled expansion spring 65 encircles the swinging frame 64, and acts to hold the stud in its opposite positions, as shown in Figs. 8, and 9. The downwardly extending arm 60$^a$ of the swinging frame 60, also carries a stud 66, on which is mounted a roll 67. The roll 67 is adapted to engage two star-shaped disks 68, and 68$^a$, each fast, respectively, on the pattern chain cylinder shafts 40, and 40$^a$, as shown in Figs. 8 and 9. The engagement of the roll 67 with the star-shaped disks 68 and 68$^a$ in connection with the spring 65, acts to lock and hold the swinging frame 60 in its two opposite positions, shown in Figs. 8 and 9. The rotary movement of the pattern chain cylinder shafts 40, and 40$^a$, through the rotary movement of the star-shaped disks 68, and 68$^a$, and the engagement thereof with the roll 67, moves the downwardly extending arm 60$^a$ on the swinging frame 60, in one direction or the other, as shown in Figs. 8 and 9.

Extending over the two pattern cylinders 41, and 41$^a$, and the pattern chains 41', and 41$^{a\prime}$ thereon, are what I term the intermediate pattern levers or indicators 69 (see Figs. 8 and 9); each of which is pivotally supported on a stud 70 on a pattern finger or indicator 71. The pattern indicator fingers 71 are pivotally mounted on a transverse rod 72 mounted on the dobby frame. The indicator fingers 71, at their inner ends are provided with an upward extension 71', adapted to engage directly with the lower hook 73, pivotally mounted on the lower end of a harness lever 74, and the inner end of the pattern indicator finger 71 has also a recess 71'' therein for the lower end of the upright wire 75, which is adapted to extend under the upper hook 73$^a$, see Figs. 10 and 11, which hook is pivotally mounted at 73$^{a\prime}$ on a harness lever 74, near its central portion. The harness levers 74 are preferably of the same construction and operation as the harness levers shown and described in my U. S. Letters Patent, No. 884,613, above referred to. Each harness lever has a fulcrum point 76 at its lower end, and a second fulcrum point 77 near its middle portion, each of said fulcra being stationary. The lower fulcrum 76 consists of a transverse bar, which has a series of outwardly extending plates 76' thereon, which act as guides for the lower ends of the harness levers 74. The other fulcrum of the harness levers 74 consists of a stationary transverse bar 77, preferably of the shape shown, and adapted to extend through arc-shaped recesses or openings 74' in the levers 74, and having a concave shaped recess on its inner side, to receive a convex shaped projection 74'' on the levers 74. By making the fulcrum 77 of the shape shown in connection with the levers 74 having the convex shaped projection 74'' thereon, to extend into and turn in the concave shaped recess in the bar 77, I obtain a fulcrum for the central part of the levers 74, to turn or rock on, which will maintain the attached ends of the upper hooks 73$^a$ in a fixed position while the lower hooks are in operation, see Fig. 10. The revolution of the pattern chain cylinder 41ª and the pattern chain 41ª' thereon, when the swinging frame 60 is in the position shown in Fig. 8, will, through the engagement of the pattern pins or pegs with the intermediate fingers 69, raise said fingers at one end, while the opposite end will rest on the transverse bar 61, said transverse bar acting as a fulcrum, and the intermediate fingers 69 will raise the pattern indicator fingers 71 at their outer end, and lower them at their inner ends, to allow the two hooks 73 and 73ª to drop down in a position to be engaged by the lifter bars 8, as shown in Fig. 11. When the swinging frame 60 is in its opposite position shown in Fig. 9, the pattern chain cylinder 41 is in operation, and the engagement of the pegs on the pattern chain 41ª with the intermediate fingers 69, will raise said fingers at their inner ends, and the outer transverse bar 60' will act as a fulcrum for the opposite end of the intermediate fingers 69. Said fingers 69 raise the pattern indicator fingers 71 at their outer end, to operate the hooks 73 and 73ª, in the same manner as above described.

From the above description in connection with the drawings, the operation of my improvements will be readily understood by those skilled in the art, and briefly is as follows: When the loom is in operation, and the rotation of the box pattern chain cylinder 43, which carries the box pattern chain 35ª, causes a pattern roll 35ª' to be moved, in this instance under the pattern indicator finger 44, as shown in Figs. 1 and 5, said indicator finger 44 is raised and engages with its flattened end 44' the inner end of the screw 47, to raise one of the side projections on the lever 49 and move said lever on its pivotal support to the left, as shown in Fig. 1. Through the intermediate connections from the lever 49 to the arm 52 and the downwardly extending lever 56 on the dobby frame, said arm 52 is moved to the left, as shown in Fig. 1, and the sleeve 38 on the shaft 22 is moved to the left, to bring the worm portion 38'' on the right end of said sleeve in the position shown in Fig. 1, to communicate rotary movement to the dobby pattern cylinder 41ª. The second dobby pattern cylinder 41 is held stationary by the straight toothed portions 36' and 38'. As long as a pattern roll 35ª' comes under the pattern indicator finger 44, the dobby pattern cylinder 44ª remains in operation. When in the further rotation of the box pattern chain cylinder 43, a tube comes under the pattern indicator finger 44, and a pattern roll 35ª raises the other indicator finger 45 at the right in Fig. 1, said finger engages with its flattened end 45' the screw 48, and raises a side projection on the downwardly extending lever 49, and moves said lever to the right, from the position shown in Fig. 1, and through intermediate connections to the arm 52, and the downwardly extending lever 56 on the dobby frame, moves said arm 52 to the right, and also moves the sleeve 38 on the shaft 22 to the right, to bring the worm portion 38'' on the left end of said sleeve in Fig. 1, in position to rotate the dobby pattern cylinder 41. The other dobby pattern cylinder 41ª is held stationary by the straight toothed portions 36'\ and 38'. As long as a roll 35ª' comes under the pattern indicator finger 45, the dobby pattern cylinder 44 remains in operation. The alternating operation of the two dobby cylinders 41 and 41ª, is indicated only by the pattern chain, which is carried in this instance on the box pattern chain cylinder 43.

A multiplier mechanism of any usual and well known construction is combined with the pattern chain mechanism, and by means of said multiplier mechanism the box pattern chain is operated or stopped for any required number of picks, according to the indication of the multiplier pattern chain, and through the intermediate connections above described with the dobby pattern mechanism one or the other of the dobby pattern chain cylinders is operated, according to the indications of the multiplier pattern chain. The multiplier pattern chain 29ª causes in this instance, through the raising of a pattern indicator finger 29, and through connections to a pin wheel 23, the movement of said pin wheel into engagement with the star wheel 24 of the box pattern chain cylinder 43, to rotate said cylinder. The multiplier pattern chain cylinder is rotated through the engagement of the pin wheel 30 with the star wheel 31, through intermediate connections from a pattern indicator lever 35', which extends over the box pattern chain and is adapted to be raised by the end of a chain bar of said pattern chain, which is of sufficient length to project under said lever 35', in the usual and well known way.

It will be understood that the details of construction of my improvements may be varied if desired.

Having thus described my invention, what I claim as new and desire to secure by Letters Patent is:

1. In a loom of the class described, pattern cylinders, worm gears on said cylinders, worms to operate said cylinders, said worms being adapted in one position to turn said worm gears, and in another position to hold them at rest, and means to shift said worms longitudinally.

2. In a dobby of the class described, pattern cylinders, worm gears connected therewith, worms for operating said gears, means to move said worms longitudinally, to cause the cylinders to rotate or remain at rest, and means to lock said worms, to prevent longitudinal movement thereof.

3. In a dobby of the class described, pattern cylinders, means to operate said cylinders, said means consisting of a rotatable shaft, and a sleeve adapted to rotate with and slide on said shaft, pattern surfaces, connections between said pattern surfaces and said sleeve, to positively move said sleeve in either direction on said shaft.

4. In a dobby of the class described, two sets of pattern surfaces, a rotatable cylinder for each set of pattern surfaces, indicating fingers under the control of said pattern surfaces, said fingers pivoted adjacent their centers, and means to rock said indicating fingers about their pivotal point, to bring one set of pattern surfaces into operation, and the other set out of operation.

5. In a dobby of the class described, two sets of pattern surfaces for the harnesses, indicating fingers therefor, said fingers pivoted near their centers, and adapted to be operated by either set of pattern surfaces, and means to rock said fingers to bring one set of pattern surfaces into operation, and the other set out of operation.

6. In a dobby of the class described, harness levers, two sets of pattern surfaces therefor, lifter hooks connected with said harness levers, fingers to support the outer end of said hooks, indicating fingers pivoted on said supporting fingers, and means to shift said indicator fingers from operative engagement with one set of pattern surfaces to operative engagement with the other set of pattern surfaces.

7. In a dobby of the class described, the combination with two pattern cylinders, each carrying a pattern surface, and having a star-shaped disk secured thereto, of a roll on an arm on a swinging frame, and said swinging frame, pivotally supported and adapted to be moved or rocked by the engagement of said disks with said roll, to bring one pattern surface into operation, and the other out of operation, and mechanism for holding said swinging frame in its opposite positions.

8. In a dobby of the class described, the combination with two pattern cylinders, each carrying a pattern surface, and having a star-shaped disk secured thereto, of a roll on an arm on a swinging frame, and said swinging frame, pivotally supported, and having oppositely extending arms carrying transverse bars, said swinging frame adapted to be moved by the engagement of said disks with said roll, and mechanism for holding said swinging frame in its opposite positions, and pattern indicators moved by said frame, each of said pattern indicators pivotally mounted on an intermediate lever, and said intermediate levers, adapted to operate the hooks of the shedding mechanism.

9. In a dobby, the combination with the harness levers, of a transverse bar forming a fulcrum for said harness levers, and extending loosely through curved or arc-shaped recesses in said harness levers, intermediate their ends, and having a concave shaped recess therein, to receive a convex shaped projection on said harness levers, for the purpose stated.

EPPA H. RYON.

Witnesses:
JOHN C. DEWEY,
M. HAAS.